FIG_4

FIG_5

FIG_6

FIG_7

FIG. 8

FIG_9

INVENTOR.
JAMES R. JONES
BY Townsend and Townsend
ATTORNEYS

FIG. 13

INVENTOR.
JAMES R. JONES

FIG.14

INVENTOR.
JAMES R. JONES
BY Townsend and Townsend
ATTORNEYS 3,511,351
Patented May 12, 1970

3,511,351
STORAGE AND RETRIEVAL CONTROL
APPARATUS AND METHOD
James R. Jones, Mountain View, Calif., assignor to The Wurlitzer Company, Chicago, Ill., a corporation of Delaware
Filed May 8, 1968, Ser. No. 727,536
Int. Cl. G11b 19/08
U.S. Cl. 194—15                             18 Claims

ABSTRACT OF THE DISCLOSURE

Apparatus and a method for controlling the operation of mechanical or other equipment having a plurality of information storage members arranged in preselected positions in an array and an actuatable information retrieval mechanism movable relative to the array wherein selective access to the information of any one of such storage members can be achieved by generating output signal groups representing, respectively, the position of a selected storage member and its number in the array, whereby simplified counting techniques can be used to store such number and thereafter use it for positioning said retrieval mechanism adjacent to the selected member itself for effecting the readout of the information on the member. The unit uses solid state electronic elements to minimize cost and to provide for optimum reliability. The invention is adapted for a number of different uses but is especially adapted for use in controlling a phonograph unit having a plurality of record disks or magnetic tape means on which is recorded a number of musical selections or the like.

This invention relates to improvements in electronic control of mechanical and other apparatus and, more particularly, to control apparatus and method for information retrieval purposes.

While the present invention is adapted for controlling any one of a number of different information retrieval systems, it is especially adapted for use with, and will hereinafter be described with respect to, a coin-actuated phonograph unit of the type having a number of individually playable record disks provided with musical selections or the like on opposite sides thereof. It is to be understood, however, that a phonograph unit utilizing a flexible, magnetic, pre-recorded tape can also be controlled by carrying out the teachings of this invention.

In the past, control systems for coin-actuated phonograph units have included, in addition to some type of selection memory or storage device, electromechanical elements, such as levers, relays, cams, springs and the like. While such control systems are satisfactory to some extent, they are relatively unreliable when compared with control systems utilizing solid state electronic elements, such as diodes, transistors and integrated circuits. Moreover, as the development of solid state components has progressed over the years, unit costs of such components have decreased to values which now render the same economically practicable and competitive with the more unreliable electromechanical elements.

In the phonograph field, only feeble attempts at best have been made to use solid state control units for control circuitry. Generally, such controls have included magnetic core memories which, because they store a record position, are limited to the response times of the record-scanning mechanism itself, a mechanical device which is relatively slow in operation. Magnetic core memories also require separate read-in and readout mechanisms because of the relatively long scanning times required to read out the information to the memories. This feature increases both the number and the cost of components necessary to operate control units of this type.

The present invention improves upon conventional control units, even those having magnetic core memories, by providing for a fast electronic read-in and readout of a memory unit without stalling the signal inputs to the memory for long periods of mechanical scan of the playback mechanism. This end is achieved by structure which does not require separate read-in mechanisms and readout mechanisms.

The present invention achieves the aforesaid results by generating a first signal group representing a number which corresponds to the position of an information-containing member with which the control unit is utilized. Thus, if the invention is used to control a phonograph unit having a number of record disks, the generated signal will represent the number of the position of a selected record in the stack or array in which the record is normally disposed. The signal group representing the number is then electronically stored at a specific location in a memory and the memory is read out to present another signal group representing once again the number of the selected record position. The playback mechanism then scans and senses the last-mentioned signal group so as to be able to become coupled to the record itself for playback purposes.

The present invention, therefore, provides for the selection of a record or other information-containing members from a stack or array, representing the record selection as a number corresponding to the record position in the stack, storing the number as a location in a memory, and reading out the information from the memory as a number once again which can be scanned by the playback mechanism. This manner of control provides for greater efficiency in retrieval of information contained on members, such as phonograph records, in that read-in and readout can be accomplished simultaneously, with a minimum number of components, and at greater speed. Because the read-in and readout actions of the invention are relatively fast, no separate read-in and readout mechanisms are required as is necessary with conventional apparatus.

The present invention also provides an improved control apparatus for a phonograph unit by utilizing a first storage assembly capable of storing a plurality of record selections and a second storage assembly capable of receiving the next record selection to be played. Thus, the first storage assembly can continue to store record selections as the second storage assembly readies the next selection for scanning and play by the record playback mechanism. Moreover, the storing of selections in the first storage assembly can be done by the same structure which transfers a record selection to the second storage assembly from the first storage assembly.

The primary object of the invention is, therefore, to provide control apparatus and method for use in information retrieval applications wherein selective access can be had to any one of a plurality of information-containing members by generating signal means corresponding to the number of the position of a selected member in an array, then storing the number in a particular location for subsequent readout, and thereafter reading out the particular stored location as a number once again which can then be scanned by a suitable playback or readout mechanism whereby selecting and storing of information can be accomplished as the information on a previously selected member is being read out by the mechanism.

Another object of this invention is to provide a control unit for a phonograph unit wherein a first storage assembly capable of storing a plurality of record selections is coupled to a second storage assembly capable of placing the next record selection to be played in readiness to be scanned by the playback mechanism to thereby allow the first storage assembly to continue to store record selections without being stalled by the scanning action of such playback mechanism.

Another object of this invention is to provide apparatus and a method for controlling the operation of a photograph unit provided with a plurality of record disks and a playback mechanism movable in scanning relationship to the record disks so that the records can be selected and played in a manner to avoid having the playback mechanism stall the inputs to the memory of the phonograph unit to thereby provide a more efficient control action than is available with units of conventional construction.

Another object of this invention is to provide apparatus and a method of the type described which permits the use of both a main selector unit and a number remote selector unit for a coin-actuated phonograph system.

Other objects of this invention will become apparent as the following specification progresses, reference being had to the accompanying drawings for an illustration of the circuitry of a preferred form of the apparatus.

The present invention will hereinafter be described as the control means of a coin-actuated phonograph having a plurality of record disks. However, the invention is not to be limited to this application and those skilled in the art will recognize, after reading the following description, that the invention is applicable to a number of other uses for controlling selective actuation of other mechanical or electronic structure.

Figure 1:
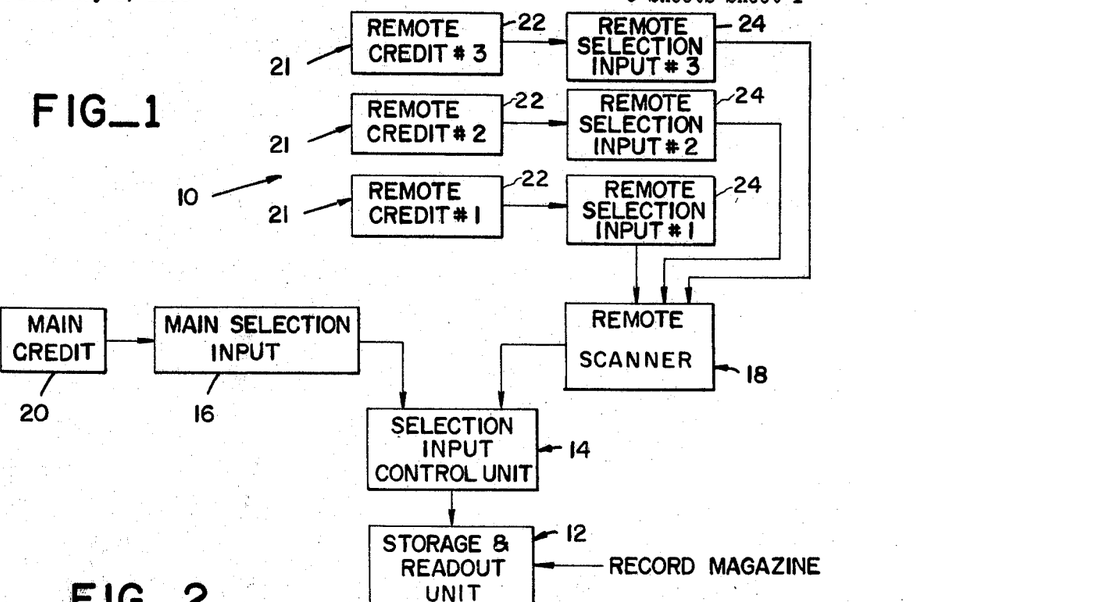
FIG. 1 is a block diagram of the apparatus when it is used as the control mechanism for a coin-actuated phonograph having a main unit and a number of remote units.

Apparatus 10 as shown in FIG. 1, includes a storage and readout unit 12 operated by a selection input control unit 14 which, in turn, receives its actuating electronic signals either from a main selection input 16 or from a remote input scanner 18 used with a number of remote units 21. Main selection input 16 is actuated by a main credit unit or totalizer 20 and remote input scanner 18 is used to scan any one of a number of different remote selection inputs 24, each input 24 being provided for a respective remote unit 21 and having its own remote credit unit or totalizer 22.

Selections for the various plays of the record disks of apparatus 10 are made by selection input buttons, there being a complete set of input buttons for each of the main unit and each remote unit, respectively. The input buttons of each set are split into the customary two sections, the numeric section 0 to 9 and the alpha section A to W so that 200 record selections can be played. The nine numbers in the numeric section are given the following values of 0 to 180 in steps of 20, i.e., 0, 20, 40, 60, 80, 100, 120, 140, 160 and 180. The letters in the alpha section are given values of 0 to 19 corresponding to the letters A to W with the exception of the letters I, O and Q.

Each selection is entered into a selection input buffer comprised of eleven RS flip-flops when a button of the alpha section and a button of the numeric section are depressed, there being a selection input buffer in the main unit 16 and one in each remote unit, respectively. The flip-flop positions of each selection input buffer have weighted numerical values corresponding to the weighted number code used throughout the selection system to simplify the entering of a record selection. This weighted number code is as follows: 1, 2, 4, 2, 10, 20, 40, 80, 160. The code permits the counting to a total number of 319 but for the particular use described herein, it need only be used to count to 199.

The alpha section will enter the B to W (1 to 19) selections into the set terminals of the first five RS flip-flops in the selection input buffer. The numeric section will enter 1 to 9 (20 to 180) selections in steps of 20 into the set terminals of the last four RS flip-flops of the selection input buffer. The two 0 values, A in the alpha section and 0 in the numeric section, are entered as a logic 1 into their own RS flip-flops in the selection input buffer.

The selection number, after being entered into the selection input buffer in either the main unit or a remote unit, is transferred by gating circuits to a main input buffer on command from a selection input control unit forming a part of the apparatus. The selection number is stored in the memory section of storage and readout unit 12 as a bit in one of 200 JK flip-flops arranged to present an end-around shift register which defines the memory section. A total of 200 selections for play once may be stored in the memory section of apparatus 10 as described hereinafter. However, the memory can be made as large or as small as necessary by changing the number of storage JK flip-flops in the memory itself.

The readout is accomplished by a counter which counts in the special weighted number code mentioned above from 0 to 199 as a scanner causes the record player to scan past the record magazine of the phonograph. The generated number from the counter is compared to the next selection number stored in an output buffer until a comparison is reached. The record player will then play the correct side of the record. Storage and readout unit 12 will then replace the selection number to be played. The comparison count may be obtained in any suitable manner, such as by the periodic breaking of a light beam as the record player passes each record in the record magazine.

Figure 2:
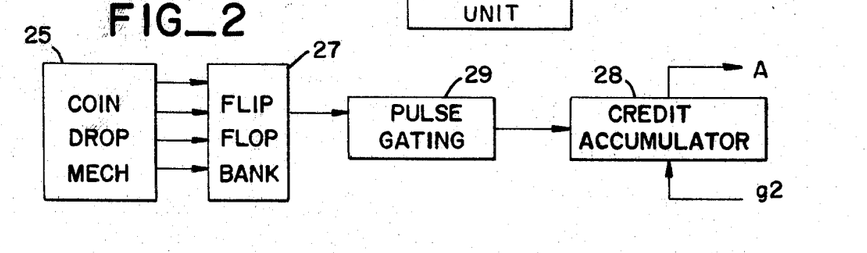
FIG. 2 is a block diagram of the credit totalizer of the main unit of the phonograph.
Figure 3:
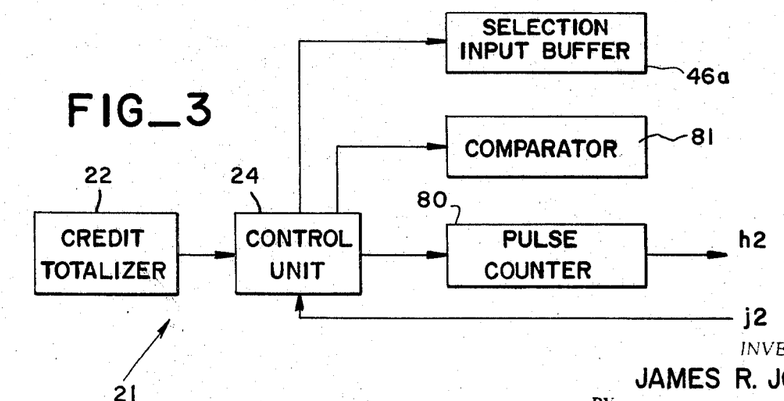
FIG. 3 is a block diagram of the selection input structure of a remote unit thereof.
Figure 4:
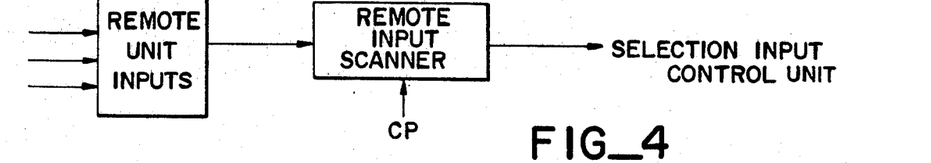
FIG. 4 is a block diagram of the scanning means for use with a number of such remote units.
Figure 5:
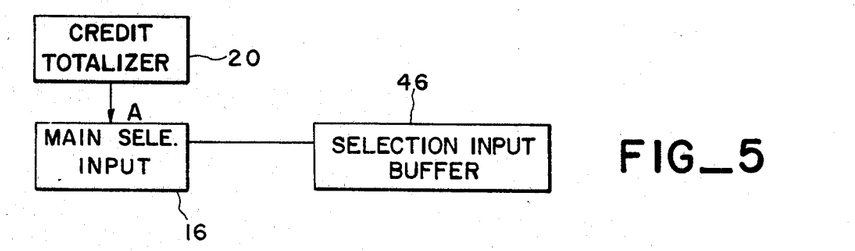
FIG. 5 is a block diagram of the selection means of the main unit.
Figure 8:
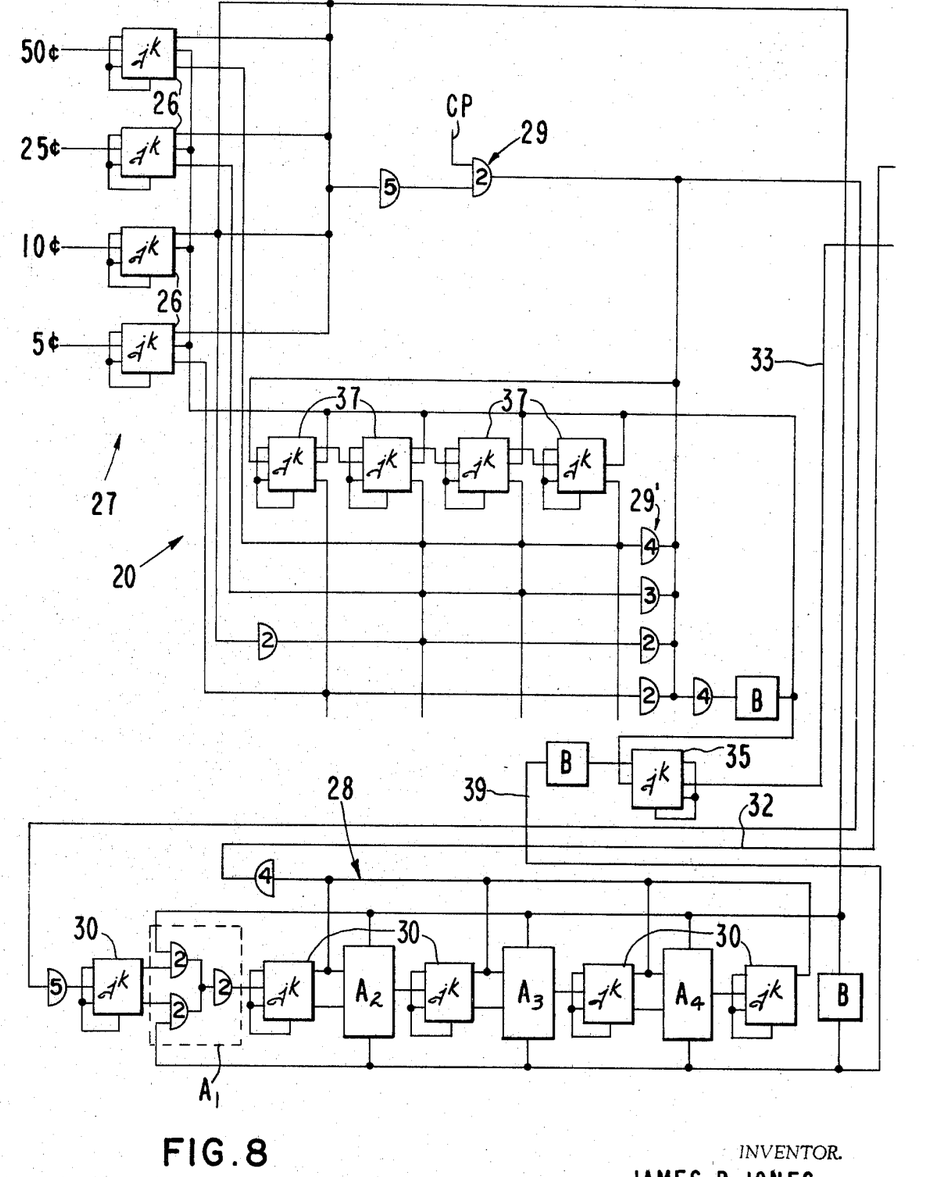
FIG. 8 is the schematic wiring diagram of the credit totalizer of the main unit.

Main credit unit 20 shown in block form in FIG. 2 and schematically in FIG. 8 totals the credit arising from the placing of coins in a coin-drop mechanism 25 and this signal triggers the proper JK flip-flop 26 (FIG. 8) of a flip-flop bank 27 (FIGS. 3 and 8). For purposes of of illustration, there is a flip-flop 26 for each of the 5-cent 10-cent, 25-cent and 50 cent slots or coin receivers, respectively, of coin-drop mechanism 25. The actuated flip-flop causes a signal to be gated by pulse gating structure 29 (comprised of at least one NOR gate) into a credit accumulator 28 comprised of JK flip-flops 30 arranged to form a count-up/count-down counter. For purposes of illustration only, each pair of signal pulses gated to accumulator 28 is worth one play with a 50-cent credit being operable to gate 14 pulses to the accumulator equivalent to seven plays. The price of a selection can be changed by a change in the gating of the pulses to accumulator 28.

All gate elements are, for purposes of illustration only, shown on the accompanying drawings as NOR gates. Other gating elements could be used if desired.

An input signal $g2$ from main selection input 16 is used to control the count-down mode of accumulator 288 of main credit 20. Thus, the accumulator is in the count-down mode when this input is present. An output signal A on lead 32 (FIG. 8) from accumulator 28 is provided when a credit of, for instance, 10 cents or more is established in the accumulator, whereby the signal is directed to main selection input 16 to permit a selection to be made. A number of NOR gating elements $A_1$, $A_2$, $A_3$, and $A_4$ are provided for accumulator 28 to effect a count-up/count-down action depending upon whether accumulator 28 is receiving credit from its coin-drop mechanism 25 or is being charged by selection input 16 by means of a signal $g2$.

As accumulator 28 counts up the credit, such gating elements are conditioned to effect this action, namely, a logic 0 on one of the two input gates of $A_1$ and a logic 1 on the other input gate. During the charging action of the accumulator, the aforesaid input gates will have the opposite logic values. The credit phase is achieved as a result of the placing of coins in the coin-drop mechanism and the charging phase is effected by a signal $g2$ which returns by way of lead 33 from selection input 16.

Figure 11:
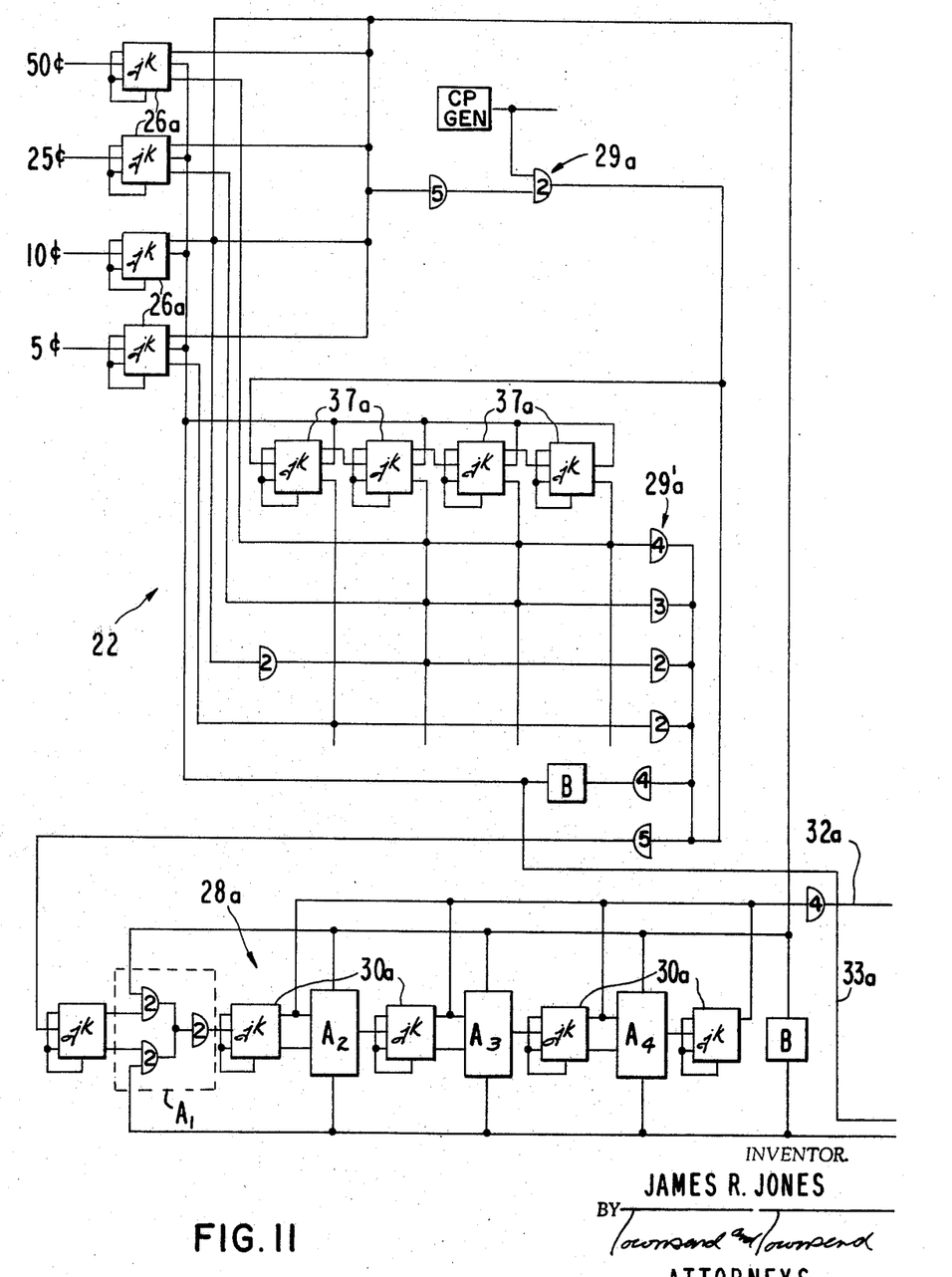
FIG. 11 is the wiring diagram for the credit totalizer of a remote unit.

Each remote unit 21 has a credit totalizer 22 constructed essentially in the same manner as main credit 20 and is operated in the manner described above. Such a remote credit unit is shown in FIG. 11 wherein a bank of flip-flops 26a are coupled to pulse gating structure 29a for pulsing an accumulator 28a comprised of a number of JK flip-flops 30a. A number of NOR gating elements $A_1$ to $A_4$ provide a count-up/count-down action depending upon whether accumulator 28a is receiving credit from its coin-drop mechanism or is being charged by the corresponding remote selection input 24. Flip-flops 37a operate to effect the credit and charging action of accumulator 28a in the same way as flip-flops 37 operate with accumulator 28.

Figure 12:
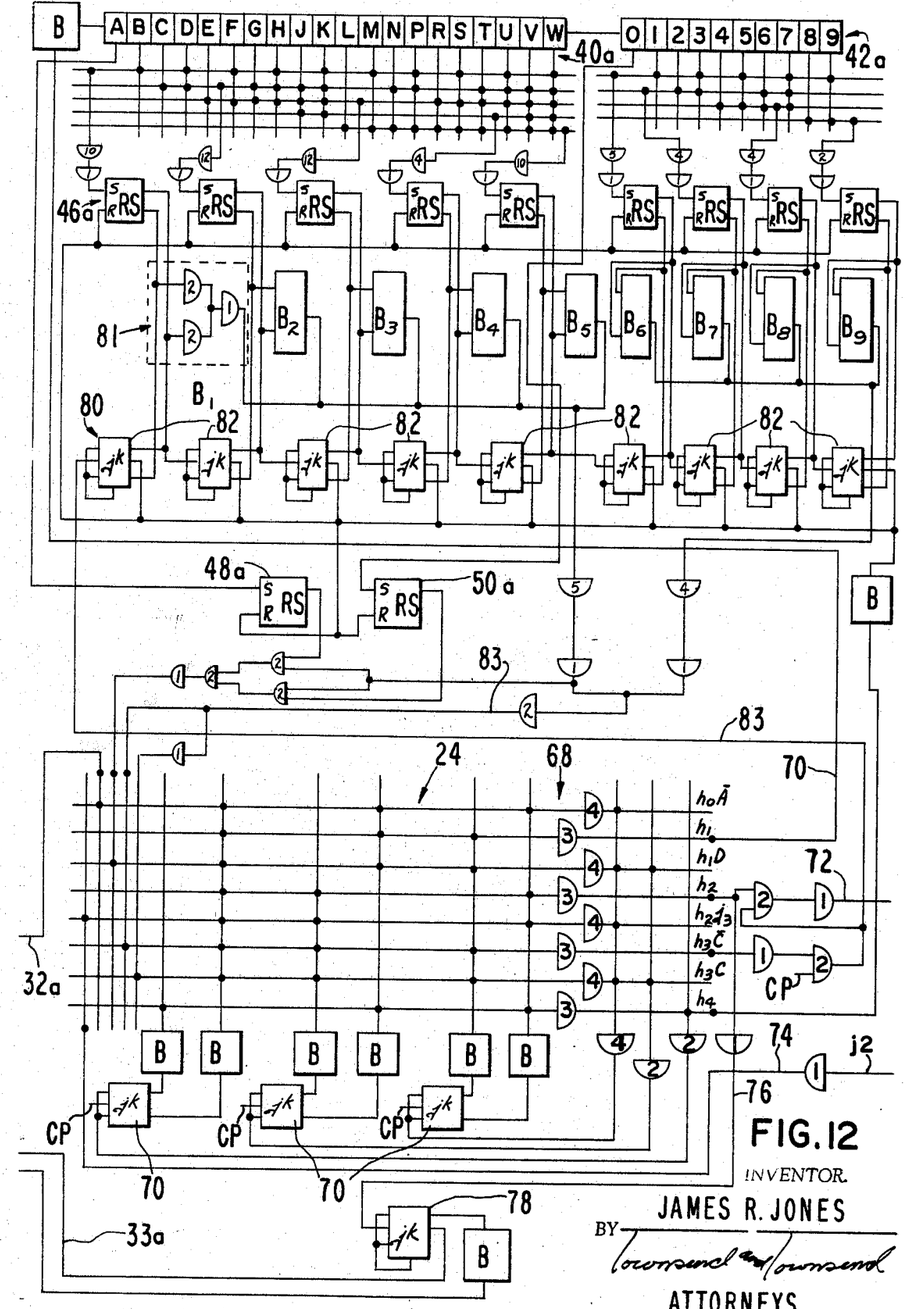
FIG. 12 is a schematic diagram of the selection input buffer of a remote unit and the control unit associated therewith.

The signal output A from accumulator 28a is directed by a lead 32a to the corresponding remote selection input 24 (FIGS. 11 and 12). The charging signal $h2$ from input 24 is returned to remote credit 22 by a lead 33a.

Figure 10:
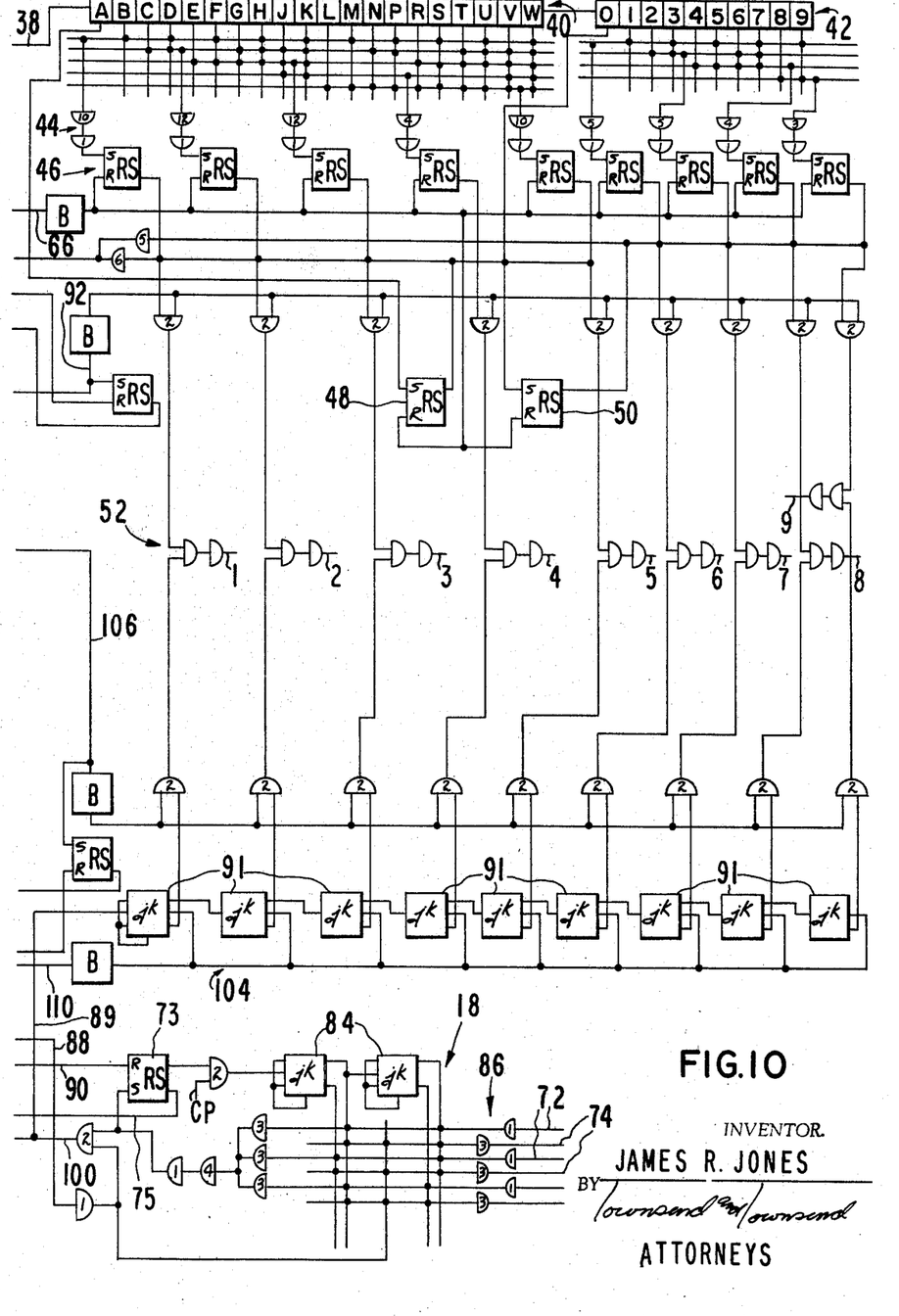
FIG. 10 is the wiring diagram of the selection input buffer for the main unit and the scanner for the remote units.

In the main unit, credit information received from accumulator 28 in the form of control signal A indicates, for purposes of illustration, that at least 10 cents or more credit has been accumulated to permit one or more record selections to be made. This signal is transferred by lead 32 to main selection input 16 comprised of a bank 34 of NOR gates and a pair of JK flip-flops 36 coupled to the NOR gates. By gating signal A and by actuating flip-flops 36, main input 16 will apply power by a signal $g1$ by means of a lead 38 to the alpha section 40 and the numeric section 42 of the main unit. Sections 40 and 42 are coupled by a bank 44 of NOR gates to a selection input buffer 46 comprised of five RS flip-flops for alpha section 40 (from B to W) and four RS flip-flops for numeric section 42 (from 1 to 9). The A and O buttons of sections 40 and 42 have respective RS flip-flops 48 and 50 (FIG. 10).

Figure 14:
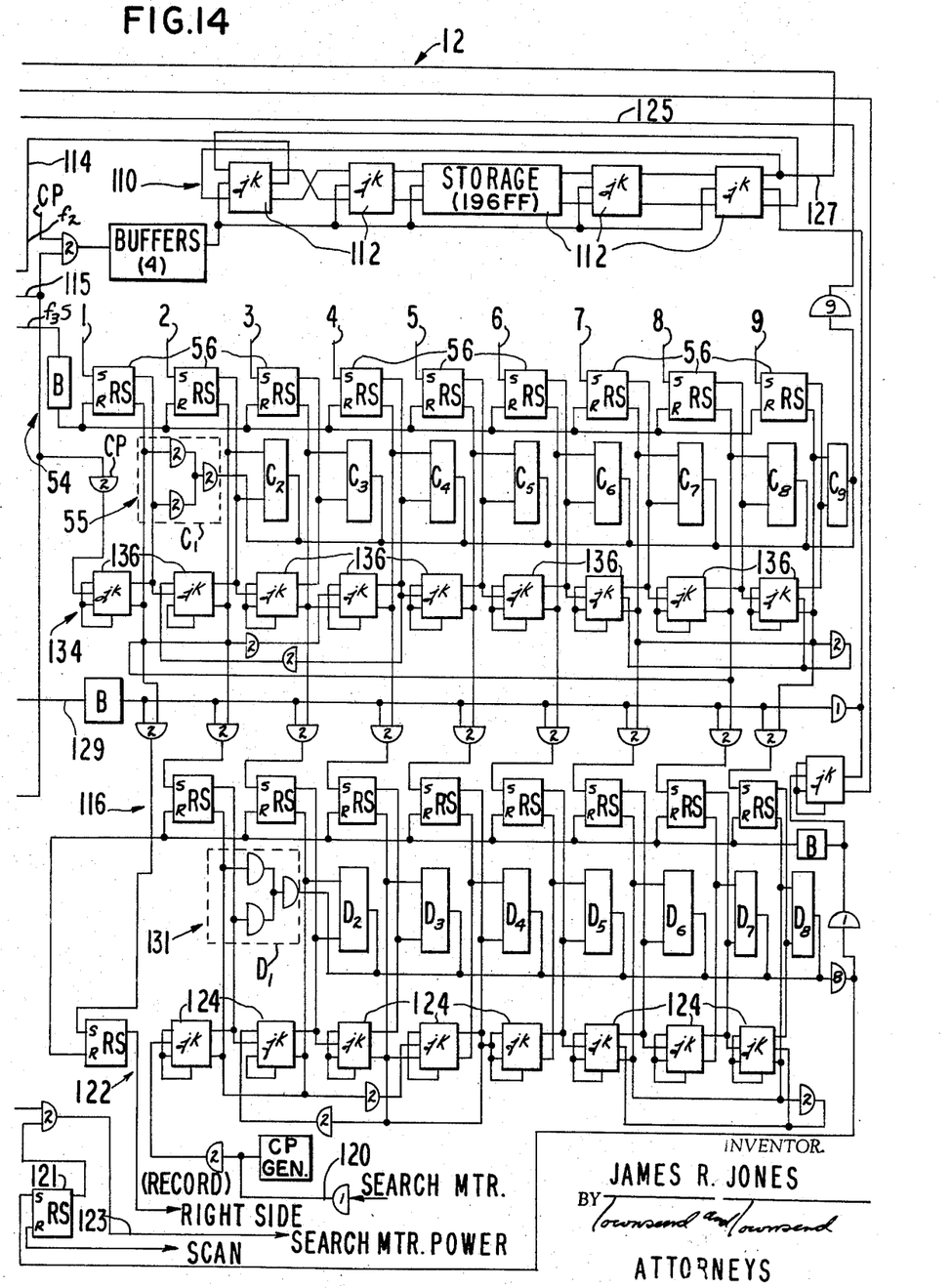
FIG. 14 is the circuitry for the storage and readout unit itself.

When a selection is to be made, one of the buttons of section 40 and one of the buttons of section 42 are depressed to, in turn, actuate the corresponding flip-flops of buffer 46. The signal outputs of the actuated flip-flops of buffer 46 will, upon command from selection input control unit 14 (FIGS. 1 and 9) by a signal $j1$, be directed through a pulsed gating section 52 (FIG. 10) to a main input buffer 54 having nine RS flip-flops in parallel (FIG. 14). The numerals 1 to 9 applied to the gating elements of bank 52 (FIG. 10) correspond to the numerals 1 to 9 at the inputs of flip-flops 56. Thus, the signal outputs or output signal group from buffer 46 will represent the number of the position of the selected record in the stack or array in which it is disposed and the signal outputs or output signal group of buffer 54 will also represent the number of the selected record in such array.

After the selection number has been made by depressing a button in each of sections 40 and 42 (FIG. 10), input 16 removes the power from sections 40 and 42 through the medium of flip-flops 36 (FIG. 9) and the associated gating elements. Input 16 will then send control signal $g2$ by a lead 33 to control unit 14 for control purposes. This same signal $g2$ will be sent to main credit 20 to effect a count-down action of accumulator 28 as set forth above.

The various operational modes of main selection input 16 are as follows:
are as follows:

$g0$—Rest position
$g1$—Power directed to selection input buttons enabling a record selection
$g2$—Transmit control signal to selection input control unit 14 and send charge control signal to the main credit 20

The signal inputs to main selection input 16 are as follows:

$j4f4M$—Control pulse from selection input control unit 14 causing input 16 to reset the selection input buffer 46 to zero and return to the rest mode $g0$
A—Credit worth one play or more has been accumulated by main credit 20
B—Selection number has been entered into selection input buffer 46

The signal outputs from input 16 are as follows:

$g1$—Power to selection buttons
$g2$—Control signal to selection input control unit 14 and main credit 20

Selection input control unit 14 is comprised of a bank of NOR gates 60 and a number of JK flip-flops 62 coupled to a clock pulse generator and to the output ends of various NOR gates of bank 60.

Figure 9:
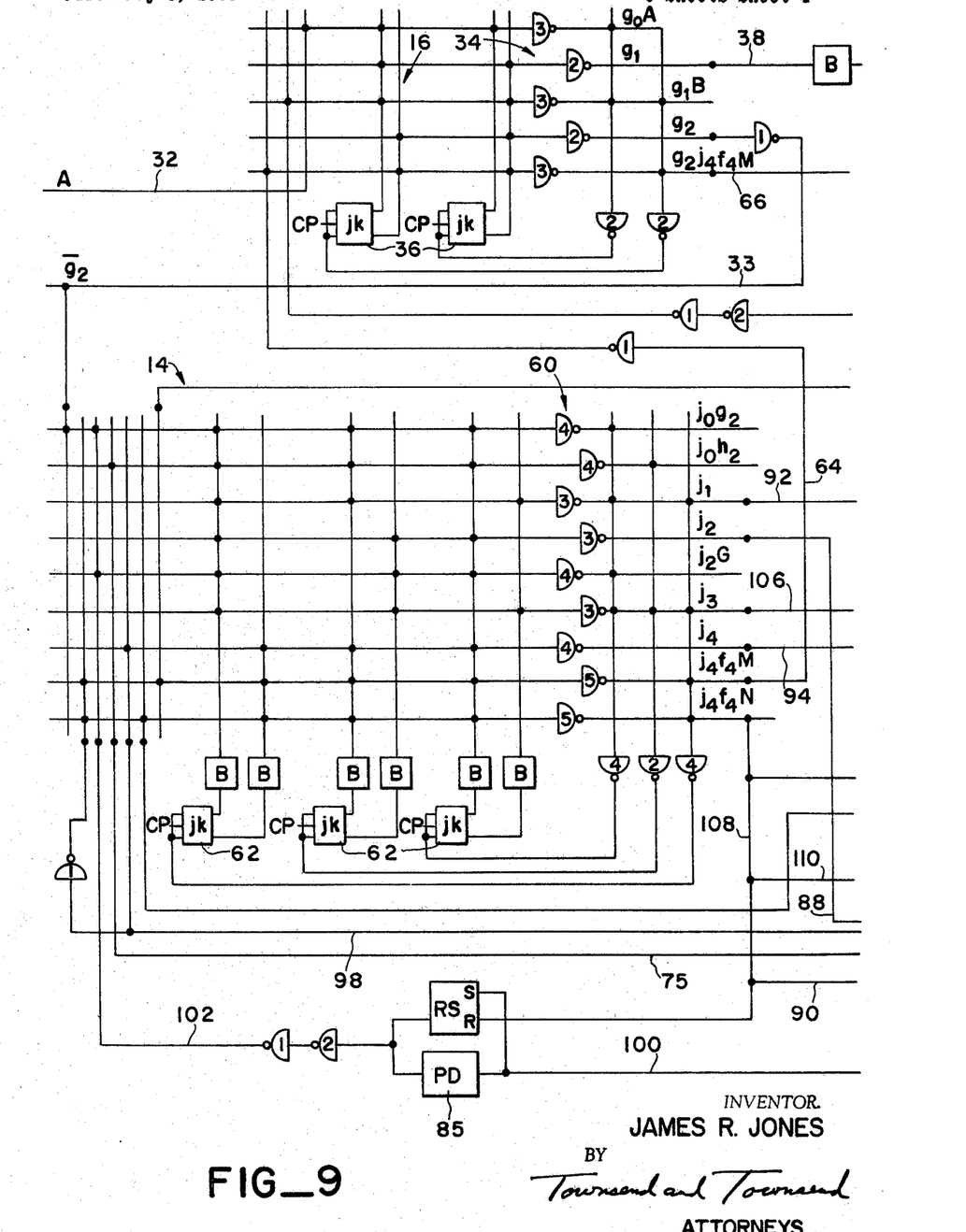
FIG. 9 is a wiring diagram of the main selection input and the selection input control unit.

Control unit 14 will, after the selection has been entered into main input buffer 54, send a control pulse $j4f4M$ back to input 16 by a lead 64 causing input 16 to reset the selection input buffer 46 to zero. This pulse also effects the return of input 16 to the rest position to await another control signal from main credit 20. The signal for resetting the flip-flops of selection input buffer 46 (FIG. 10) is $g2j4f4M$ by way of a lead 66 (FIGS. 9 and 10).

Each remote unit 21 operates in essentially the same way as described in the foregoing with respect to the main unit. Specifically, when a control signal A' is at the output side of accumulator 28a, indicating 10 cents or more credit has been accumulated, the signal is directed by lead 32a to the corresponding remote selection input 24 (FIG. 12) which is comprised of a bank 68 of NOR gates and a number of JK flip-flops 70 connected to the NOR gates. By virtue of signal A', input 24 will apply power to the alpha section 40a and the numeric section 42a by a lead 70 (FIG. 12). The selection is made by depressing the buttons of sections 40a and 42a and, when a selection has been made, input 24 will remove power from the alpha and numeric sections and will send a control signal toward the selection input control unit 14 of apparatus 10. However, this latter signal must first be scanned by remote scanner 18 as hereinafter described. This signal ($h2$) is sent from input 24 by a lead 72 (FIG. 12). Selection input control unit 14 will send a return control signal ($j2$) back down a separate line to input 24 when control unit 14 is ready to receive the selection number generated by actuating the push buttons of sections 40a and 42a. This return control signal ($j2$) is directed by a lead 74 to input 24 (FIG. 12).

The signal ($h2$) sent from input 24 to control unit 14 is also sent by a lead 76 to a JK flip-flop 78 which, in turn, sends a signal by way of lead 33a to accumulator 28a to effect a charging or countdown action thereof.

Also, when the selection has been entered in sections 40a and 42a, the selection input buffer 46a (FIG. 12) of the corresponding remote unit 21 will be actuated, such selection input buffer being comprised of five RS flip-flops corresponding to the B to W selections and four RS flip-flops corresponding to the 1 to 9 selections. Flip-flops 48a and 50a correspond to the A and 0 selection buttons, respectively.

Each remote unit 21 has a pulse counter 80 (FIGS. 3 and 12) and a comparator 81 by means of which a remote storage buffer 104 (FIG. 10) is actuated. After a selection has been made at a remote unit, a signal $h2$ is sent to control unit 14 indicating that the remote unit has a selection to be played. This signal is sent from input 24 by lead 72, flip-flop 73, and lead 75 to input 14, whereupon the latter sends a signal $j2$ back to the remote unit by way of leads 88 and 74 to actuate the corresponding input 24 (FIG. 12) which causes a signal $h3\overline{C}$ to be directed to pulse counter 80 by lead 83 as well as to storage buffer 104 by leads 72, 100 and 89 (FIG. 10). Clock pulses advance counter 80 and buffer 104 until a pulse detector 85 (FIG. 9) determines that no further counting is being done. This occurs when comparator 81 causes a correlation between the number in buffer 46a and the number to which counter 80 has counted. All of the aforesaid occurs when remote scanner 18 locks on the particular remote unit so as to allow a selection number to be gated to control unit 14.

The modes of remote selection input 24 of each remote unit 21 are as follows:

$h0$—Rest position
$h1$—Power to selection input buttons, enabling record selection
$h2$—Transmit control signal to selection input control unit 14 and charge control signal to the credit totalizer 22
$h3$—Transmit selection number to selection input control unit 14
$h4$—Reset and clear all selection input storage flip-flops The signal inputs to each remote input 24 are as follows:

$j2$—Selection input control unit 14 ready to receive selection number
A—Credit worth one play or more has been accumulated in the credit totalizer 22
C—Comparator output, when the selection number has been transmitted to the selection input control unit 14
$\overline{C}$—Logical negation of C
D—Selection number has been entered into selection input buffer 46a.

The signal outputs from each remote input 24 are as follows:

$h1$—Power to selection input buttons
$h2$—Control signal to selection input control unit 14 and credit totalizer 22
$h3\overline{C}$—Gate pulses to selection input control unit 14
$h4$—Reset and clear all selection input storage flip-flops.

Remote scanner 18, shown schematically in FIG. 10, includes a pair of JK flip-flops 84 coupled to a bank 86 of NOR gates which comprise a number of pairs of gates, each pair being arranged to receive a signal from and send a signal to a respective remote unit 21. For instance, one lead 72, shown in FIG. 10, comes from the remote selection input 24 of a first remote unit 21. A corresponding lead 74 carries the signal back to the particular remote unit 21. A second pair of leads 72 and 74 are coupled to a second remote unit 21 and so on.

Scanner 18 is constantly scanning the remote input leads 72 for a control signal from a remote unit 21. This is accomplished by the use of a clock pulse input to flip-flops 84. When a control signal from a remote unit is found on a lead 72, the scanner 18 will lock on that particular lead so that a return control signal may be sent from control unit 14 to the same remote unit by lead 74. This is accomplished through a lead 88 (FIGS. 9 and 10). All other control signals on the other leads 72 must wait until scanner 18 commences scanning once again. The scanner 18 will start scanning again when a control pulse is sent by a lead 90 from control input 14 to scanner 18. While three remote units 21 have been shown in FIG. 1, the number of such remote units may be increased to any value by the use of additional flip-flops and gating circuitry.

The modes of scanner 18 are as follows:

$i0$—Scan check of remote unit one
$i1$—Scan check of remote unit two
$i2$—Scan check of remote unit three The single input to the scanner 18 is a signal $h2$ which tells control unit 14 that a remote unit is ready to send it a selection number.

The outputs of scanner 18 are as follows:

$i0h2$—Remote unit one is ready to transmit selection number
$i1h2$—Remote unit two is ready to transmit selection number
$i2h2$—Remote unit three is ready to transmit selection number
$i0j2$—Selection input control unit is ready for the first remote unit
$i1j2$—Selection input control unit is ready for he second remote unit
$i2j2$—Selection input control unit is ready for the third remote unit Selection input control unit 14 has two control cycles, namely, the main input cycle and the remote input cycle. In the main input cycle, contral signal $g2$ is received from main selection input 16 and this control signal causes control unit 14 to start in the main input cycle. Control unit 14 will, by a signal $j1$ on lead 92 (FIGS. 9 and 10), gate the selection number which is held in selection input buffer 46 to main input buffer 54 by way of the bank 52 of NOR gates (FIG. 10). Then, control unit 14 will send a control signal $j4$ by way of lead 94 to the control unit 96 of storage and readout unit 12 to actuate the latter. When storage in unit 12 has been completed, control unit 96 will send a control pulse $f4$ by way of lead 98 to control unit 14 causing it to send a control pulse $j4f4M$ by way of lead 64 to main selection input 16 before returning to the rest position. This latter signal, as mentioned above, causes the selection input buffer 46 to be set to zero to await actuation once again by input 16 upon receipt of additional credit information from main credit 20.

Figure 6:
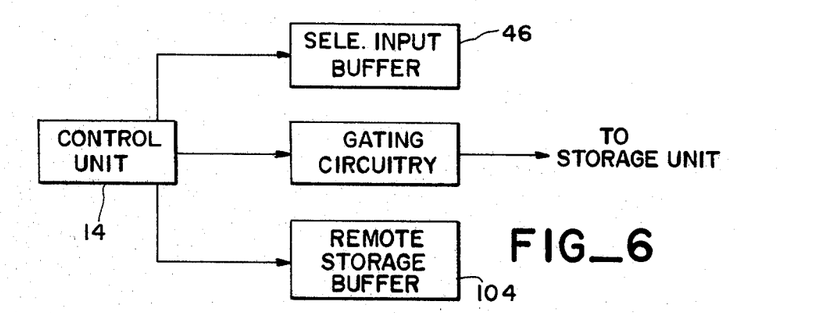
FIG. 6 is a block diagram of the selection input control unit and the buffer means which receives the control signals for the memory of the apparatus.

In the remote input cycle of control unit 14, a control signal $h2$ is received by control unit 14 from a remote unit 21 after being gated by remote scanner 18. This control signal causes control unit 14 to start in the remote input cycle. First, the control unit 14 will send a control signal $j2$ by way of lead 88 and flip-flops 84 to the particular remote unit 21. By virtue of this control signal, the remote unit will gate the stored selection number therein to the scanner by way of lead 72 and this selection number is directed by way of lead 89 to a remote storage buffer 104 (FIGS. 6 and 10) comprised of a number of JK flip-flops 91 arranged to form a counter. This selection number is pulsed by virtue of the pulse counter 80 of the particular remote unit 21 and when the last pulse has been received and counted by remote storage buffer 104, control unit 14 will gate the selections stored therein to main input buffer 54 by a signal $j3$ from control unit 14 to bank 52 by way of a lead 106 (FIGS. 9 and 10). Then, control unit 14 will send a control signal $j4$ to control unit 96 by way of lead 94 to further actuate control unit 96. When storage is completed, control unit 96 will send a control pulse $f4$ back to control unit 14 causing the latter, by means of a signal $j4f4N$, to reset the remote storage buffer 104 to zero. This is done by a lead 108 and a lead 110 (FIGS. 9 and 10). This latter signal also is used to inhibit the pulse detector circuitry and is also sent by way of lead 90 to scanner 18 causing it to start scanning the remote input leads 72 after which time control unit 14 returns to the rest position.

The modes of control unit 14 are as follows:

j0—Rest position
j1—Gate main selection input number to the main input buffer 54
j2—Transmit control signal to proper remote unit to enable transmittal of selection number
j3—Gate remote storage buffer 104 to the main input buffer 54
j4—Transmit control signal to control unit 96 and wait for storage to be completed The signal inputs to control unit 14 are as follows:

f4—Control pulse from control unit 96 when storage is completed
$\overline{f4}$—Logical negation of f4
g2—Control signal from control unit 14 to start main input control cycle
h2—Control signal to start remote input control cycle
G—Last pulse from remote unit has been received
M—Selection input control unit 14 in main input control cycle
N—Selection input control unit 24 in remote input control cycle The signal outputs of control unit 14 are as follows:

j1—Control pulse to gate selection input buffer 46 to the main input buffer 54
j2—Control signal to proper remote unit to enable transmittal of selection number
j3—Control pulse to gate remote storage buffer 104 to the main input buffer 54
j4f4—Control signal to control unit 96 to start storage
j4f4M—Control pulse to main selection input 16 to reset selection input buffer 46 to zero
j4f4N—Control pulse to reset the remote storage buffer 104 to zero, inhibit the pulse detector circuitry, and start scanner 18 scanning the remote input lines 72.

Figure 7:
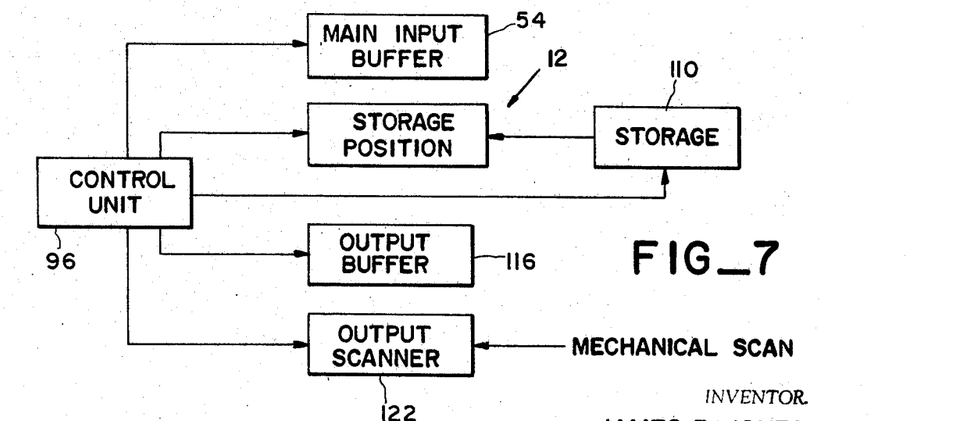
FIG. 7 is a block diagram of the selection storage and readout unit of the apparatus.
Figure 13:
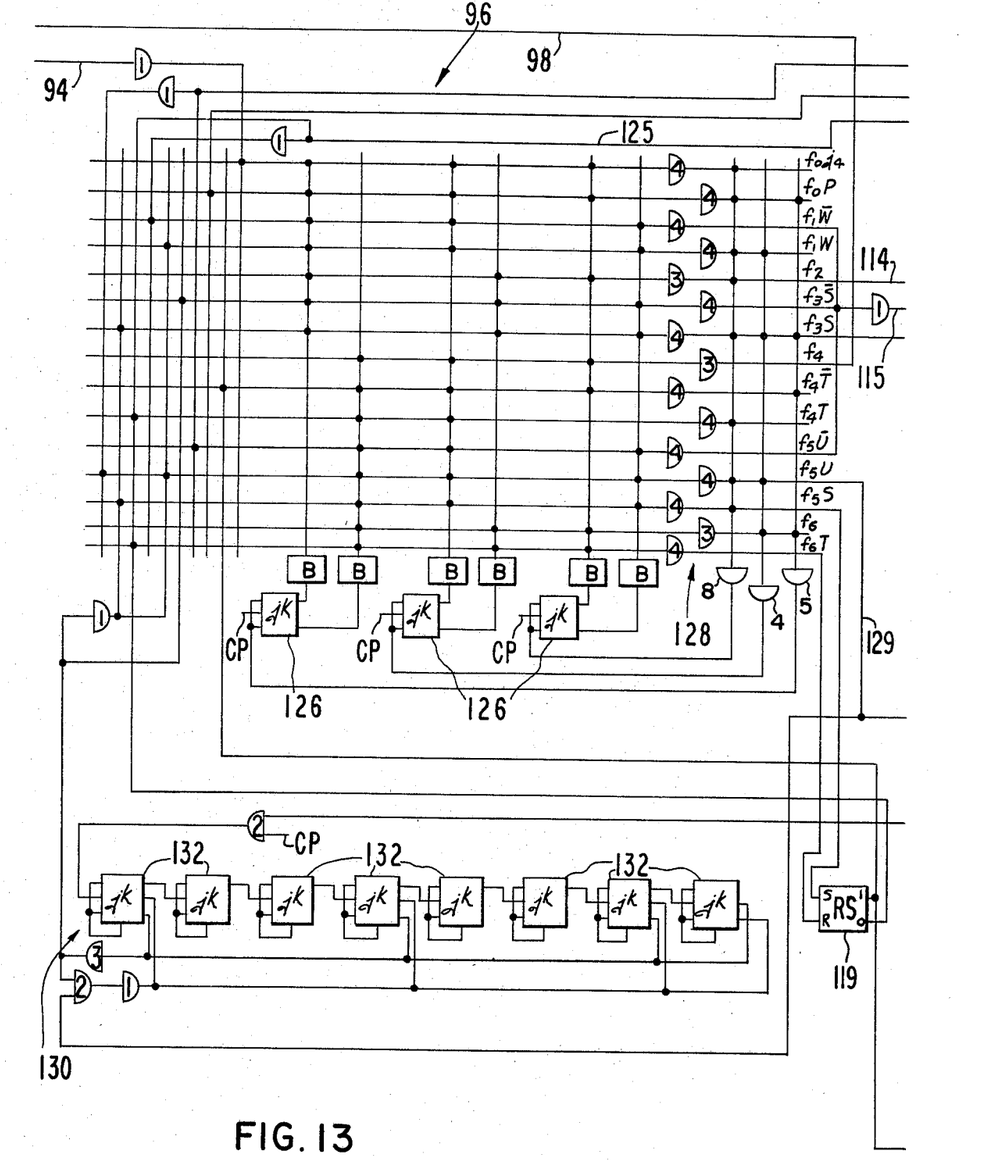
FIG. 13 is the control section for the storage and readout unit.

Control unit 96 has two control cycles, one is for selection storage and the other is for selection readout. When a selection has been entered into main input buffer 54, control unit 14 starts control unit 96 in the selection storage control cycle. Control unit 96 sends a signal $f1\overline{W}$ to storage register or memory unit 110, comprised of 200 JK flip-flops 112 arranged as an end-around shift register. Signal $f1\overline{W}$ is conducted by a lead 115 to a clocking gate connected to the flip-flops of memory 110 as shown in FIG. 14. The control signal $f1\overline{W}$ effects the advance of register 110 to the correct storage position determined by a comparison signal from the comparator 55 associated with main input buffer 54 (FIG. 14). Control unit 96, by means of another output signal f2, causes the selection to be stored as a logic one at that storage position. Control unit 96, through counter 130 (FIG. 13), then resets or returns memory 110 to the same position from whence it started, i.e., by counting up to 200. Control unit 96 will next go to the selection readout cycle if the output buffer 116 (FIGS. 7 and 14) has been previously emptied. If the output buffer 116 is not empty, control unit 96 sends a control pulse f4 by way of lead 98 to control unit 14 and returns to the rest position.

The selection readout cycle of control unit 96 starts when the selection in output buffer 116 is scanned by the playback mechanism of the phonograph unit. Such mechanism has a scan or search motor which receives power through a pair of RS flip-flops 119 and 121 by means of lead 123. The movement of the mechanism is sensed in some suitable manner, such as by the periodic breaking of a light beam, so as to generate a signal coupled by a lead 120 to an output scanner or counter 122 comprised of a number of JK flip-flops 124.

Control unit 96 checks for a stored logic one by scanning memory 110, and, when a logic one is found, the selection, i.e., the record number and the side of the record, is gated to the output buffer 116. While a record is being played, another selection can be stored in output buffer 116 unless a last-play condition should exist.

Output buffer 116 allows for a fast readout of memory 110 so that control unit 96 will not stall the inputs for long periods of mechanical scan. The mechanical scan, though much slower than the rest of the system, will not stall the inputs at any time.

The modes of control unit 96 are as follows:

f0—Rest position
f1—Shift storage position to agree with selection number in main input buffer
f2—Store selection as a logic (one) in storage register
f3—Shift storage position back to start position
f4—Transmit control pulse to selection input control unit and check for last-play condition
f5—Scan storage register for logic (one)
f6—Reset control unit to reset position and reset last-play condition flip-flop if necessary The inputs to control unit 96 are as follows:

j4—Control signal from selection input control unit to start selection storage control cycle
P—Control signal from output buffer to start the selection readout control cycle
S—Control pulse from two hundred pulse counter indicating that the storage register has returned to its original position
$\overline{S}$—Logical negation of S
T—Control signal from last-play condition flip-flop indicating that a last-play condition exists
$\overline{T}$—Logical negation of T
U—Control pulse from selection storage register indicating a logic (one) storage position
$\overline{U}$—Logical negation of U
W—Control signal from comparator, indicating a comparison has been reached
$\overline{W}$—Logical negation of W

OPERATION

Control unit 10 is coupled to the playback and scanning mechanism (not shown) of a phonograph unit and is adapted to control the play of 200 record disks which are arranged in some suitable manner on a carriage or the like. The selections of the records are made by the actuation of the selection push buttons of the main unit and those of the remote units.

The control unit operates when a user places one or more coins in the coin-drop mechanism of the main unit or of the remote unit. Assuming coins are placed in coin-drop mechanism 25 of the main unit (FIG. 2), the flip-flop bank 27 is actuated to apply signal pulses corresponding to the amount of the coins deposited to actuated credit accumulator 28, specifically, the JK flip-flop 30 thereof (FIG. 8). Accumulator 28, therefore, provides an output signal A on line 32 to selection input 16 which operates to apply power by lead 28 to selection buttons 40 and 42. Assuming a record selection is made by depressing a button 40 and a button 42, such buttons operate as switches to actuate input buffer 46 wherein the first five flip-flops thereof will be actuated by the alpha section of the push buttons and the remaining four flip-flops will be actuated by the numeric section of the push buttons. The result is one or more signals on the outputs of the flip-flops of input buffer 46, such output signal or signals representing a first output signal group corresponding to the number of the record position in the record stack. Thus, the push buttons are the actuators for the control unit itself, the push buttons corresponding to the positions of the records in the stack.

The first output signal group is coupled by gating elements 52 to main input buffer 54 and, upon command from selection input control unit 14 (FIG. 9) by a signal $f1$ on lead 92, the selected record number, represented by the output signal group to the flip-flops of selection input buffer 46, is transferred to the input means of main input buffer 54 and, because the flip-flops 56 of buffer 54 receive their signals in parallel with each other, the output signal group at the output means of flip-flops 56 also represents the number of the selected record.

After the number of the selected record is received by main input buffer 54, a signal is received by storage and readout control unit 96 which, through a signal $f1\overline{W}$ simultaneously starts the advance of shift register 110 and storage position counter 134. Counter 134 counts in accordance with the preselected code set forth above. When the count of counter 134 compares equally to the number stored in main input buffer 54, a signal is returned to control unit 96 by lead 125 (FIG. 14) which causes an output signal $f2$ of control unit 96 to apply a voltage to the first flip-flop 112 of storage unit 110 by means of a lead 114. A counter 130 (FIG. 13), initially actuated with shift register 110, continues to count due to the generation of an output signal $f3\overline{S}$ of control unit 96 after a flip-flop 112 has been actuated so as to effect the advancement of the shift register until the actuated flip-flop 112 returns to its starting position. Thus, the aforesaid action operates to transfer the number of the selected record (evidenced by the output signal group of buffer 54) to a position, namely, a particular flip-flop position of storage register 110. As soon as the storage register has returned to its initial starting position, a signal is sent therefrom by lead 126 to control unit 96 which then operates to read out the information into output buffer 116, if the latter is deactuated. This readout step is accomplished by sending an output signal $f5\overline{U}$ of control unit 96 to storage counter 134 and also to counter 130 as well as to shift register 110 to cause all three of these components to count to the number equal to the number position of the actuated flip-flop in register 110. When the actuated flip-flop 112 of register 110 reaches the signal-receiving location at the far right side of FIG. 14, a signal is sent back to control unit 96 by way of lead 127 to cause another output signal $f5U$ thereof to be sent by lead 129 to a number of gates (FIG. 14) which cause actuation of the RS flip-flops of output buffer 116, the latter flip-flops having input means in parallel so that the output signal group at the output means of these flip-flops represents the number of the position of the actuated flip-flop 112 to register 110 and thereby the number of the selected record.

When it is desired to read out the number represented by the output signal group of output buffer 116, the playback mechanism is actuated by supplying electrical power to its electrically actuated search motor, and, as the mechanism scans the records, it operates counter 122 whose count is compared by comparator 131 to the number represented by output buffer 116. When the count is equal to the number, the search motor is stopped with the mechanism aligned with or adjacent to the selected record. Then the mechanism moves into coupled relationship to the selected record and plays the same. During the play of the record, the output buffer 116 can then be actuated or filled to prepare it for effecting the play of the next record. Also, during the play of the record, additional selections can be entered into register 110 as the selections are made in the main unit and the remote unit.

The remote input scanner 18 operates continuously to scan remote units and to direct the information therefrom into remote storage buffer 104 (FIG. 10). The information from this buffer is gated through gates 52 to main input buffer 54 in the manner described above so that selections from the main input and from the remote inputs are successively directed to main input buffer 54.

The foregoing description of the invention has been made with respect to a phonograph unit comprised of a plurality of record disks. The teachings of the invention could be applied to a phonograph unit utilizing a flexible, magnetic tape movable between supply and takeup reels of a tape transport. The information-containing members would be segments of the tape and the scanning and playback mechanism would be transducer head structure, either a single head or several heads, movable relative to the tape even though the transducer head structure itself would be normally stationary with respect to the tape reels.

The invention can be applied to other information-retrieval applications as well as those mentioned above. For instance, the invention could be used with a microfilm machine having a camera or other retrieval device as the playback mechanism. The microfilm would be wound on supply and takeup reels and the microfilm and the playback mechanisms would move relative to each other even though the playback mechanism would ordinarily be stationary.

While one embodiment of this invention has been shown and described, it will be apparent that other adaptations and modifications of this device can be made without departing from the true spirit and scope of the invention.

The components of apparatus 10 are electronic and preferably are of solid state construction to provide reliability and to minimize production costs. Such components allow apparatus 10 to be housed so that the apparatus itself occupies only a relatively small volume.

I claim:
1. Apparatus for controlling access to a plurality of information-containing members disposed in preselected positions in an array comprising: a first, selectively actuatable structure having output means providing a first output signal group including at least one output signal with said first output signal group representing the number of the position of one of said members in said array when said first structure is actuated; means corresponding to the positions of the members in said array and coupled with said first structure for selectively actuating the latter to provide said first output signal group corresponding to a selected member; a memory unit having a plurality of memory devices, there being a memory device for each member respectively; means coupled with said first structure for actuating the memory device of said memory unit corresponding to the number represented by said first output signal group and thereby to said selected member, whereby the number of said selected member in said array is stored as a position in said memory unit; a second actuatable structure having output means capable of generating a second output signal group including at least one output signal with the second output signal group defining the number of the position of the actuated memory device in said memory unit; means coupled with said second structure for actuating the same to thereby cause said second output signal group to be generated; and means coupled with said second structure for controlling the actuation of an actuatable information-retrieval mechanism movable past said array in scanning relationship to said members so as to cause the scanning action of the mechanism to be stopped when the mechanism is adjacent to a member whose number is defined by said second output signal group, whereby the mechanism can be coupled to the last-mentioned member for retrieving the information therefrom.

2. Apparatus as set forth in claim 1, wherein said means for actuating said first structure includes a coin-actuated switch unit.

3. Apparatus as set forth in claim 1, wherein said means for actuating said first structure includes a coin-drop assembly for receiving a number of coins sufficient to provide a predetermined amount of credit, and a counter unit coupled to said assembly for totalizing the credit corresponding to the coins received thereby.

4. Apparatus as set forth in claim 1, wherein said mechanism is electrically actuated, said means for controlling the actuation of said mechanism including an actuatable device for gating electrical power to said mechanism, and a counter coupled with said second structure for actuating said gating device when the number counted by said counter is the same as the number defined by said second output signal group.

5. Apparatus as set forth in claim 1, wherein said means for actuating a memory device includes a counter capable of counting to a number equal to the number of said members, and means responsive to the counting action of said counter for directing an actuating signal to said memory unit after the counter has counted to the number defined by said first output signal group.

6. Apparatus as set forth in claim 1, wherein said memory unit includes an end-around shift register.

7. Apparatus as set forth in claim 1, wherein said memory unit includes an end-around shift register having a starting location, and means for actuating said shift register including counter means for advancing the same from said starting location through increments equal in number to said number represented by said first signal group to permit the corresponding memory device to be actuated, said counter means being disposed to advance the shift register back to said starting location after a memory device has been actuated.

8. Apparatus as set forth in claim 1, wherein said means for actuating said second structure includes a control unit operable after a memory device in said memory unit has been actuated and before the second output signal group has been generated, one of said structures including a buffer having a plurality of flip-flop elements formed from semiconductor components.

9. Apparatus for controlling a phonograph unit having a plurality of record members and a playback mechanism movable in scanning relationship to said record members comprising: a first storage assembly having a plurality of actuatable memory devices, there being a memory device for each record member respectively; means coupled with said first storage assembly for selectively and successively actuating said memory devices; a second storage assembly having output signal means capable of being scanned by said mechanism with the output signal means representing any one of said record members; and means coupled with said storage assemblies for transferring a record selection from the first storage assembly to the second storage assembly, whereby the transferred record selection will be represented by an output signal means of said second storage assembly to permit said mechanism to scan the second storage assembly for playback purposes as the first storage assembly continues to store record selections.

10. Apparatus for controlling the operation of a phonograph unit having a plurality of record members in preselected positions in an array and a record-playing mechanism movable relative to said array in scanning relationship to said record members comprising: a first, selectively actuatable buffer having output means for providing a first output signal group including at least one output signal with said first output signal group representing the number of the position of any one of said record members in said array; means coupled with said first buffer for selectively actuating the same as a function of any one of said record members in said array to cause said first output signal group to be generated; a memory unit having a plurality of actuatable memory devices, there being a memory device at a predetermined position in the memory unit for each record member respectively; first control means coupled with said first buffer for actuating the memory device of said memory unit corresponding to the number defined by said first output signal group after the last-mentioned group has been generated, whereby the number of a selected record member is stored as a position in said memory unit; a second actuatable buffer having output means for generating a second output signal group including at least one output signal with said second output signal group defining the number of the position of an actuated memory device in said memory unit; second control means coupled with said second buffer for actuating the same to cause the generation of said second output signal group after a memory device of said memory unit has been actuated; and means coupled with said second buffer for causing said mechanism to scan the record members and for stopping the scanning action of the mechanism after the mechanism has reached a location adjacent to a record member whose number in said array is defined by said second output signal group, whereby the mechanism can be coupled to the last-mentioned record member for playing the same.

11. Apparatus for controlling the operation of a phonograph unit from a pair of spaced locations with the phonograph unit having a plurality of record members in preselected positions in an array and a record-playing mechanism movable relative to said array in scanning relationship to said record members comprising: a pair of selectively actuatable input buffers, there being an input buffer for each location respectively, each input buffer having output means for providing a first output signal group including at least one output signal with said first output signal group representing the number of the position of any one of said record members in said array; means at each location respectively, and coupled with a corresponding input buffer for selectively actuating the same as a function of the position of any one of said record members in said array to cause the corresponding first output signal group to be generated; a memory unit having a plurality of actuatable memory devices, there being a memory device at a predetermined position in the memory unit for each record member respectively; control structure coupled with each input buffer for connecting the same to said memory unit when the input buffer is actuated to cause the memory device corresponding to the number defined by the first output signal group of the actuated input buffer to be actuated, whereby the number of a selected record member is stored as a position in said memory unit; an output buffer having output means for generating a second output signal group including at least one output signal with said output signal group defining the number of the position of an actuated memory device in said memory unit; a control assembly coupled with said output buffer for actuating the same to cause the generation of said second output signal group after a memory device of said memory unit has been actuated; and means coupled with said output buffer for causing said mechanism to scan the record members and for stopping the scanning action of said mechanism after the latter has reached a location adjacent to a record member whose number in said array is defined by said second output signal group, whereby the mechanism can be coupled to the last-mentioned record member for playing the same.

12. Apparatus as set forth in claim 11, wherein said control structure includes first control means for directing a first output signal group to said memory unit, second control means coupled with one of said input buffers for connecting the output means thereof to said first control means to permit the latter to direct he corresponding first output signal group to said memory unit, and third control means coupled with the other input buffer for connecting the output means thereof to said first control means after the latter has directed the first output signal group of said one input buffer to said memory unit, whereby the first output signal group of said other buffer will be directed to said memory unit.

13. Apparatus as set forth in claim 11, wherein said memory unit comprises an end-around shift register.

14. A method of controlling the operation of a unit having a plurality of information-containing members in preselected positions in an array and an information-retrieval mechanism movable relative to said array past said member in scanning relationship thereto comprising: generating a first output signal group including at least one output signal representing the number of the position of a selected member whose information is to be retrieved; storing the first output signal group in a respective one of a plurality of signal-receiving locations in a storage region with each signal-receiving location having a specific position in said region corresponding to the position of said selected member in said array; generating a second output signal group including at least one output signal representing the number of the signal-receiving location corresponding to the selected member; moving said mechanism relative to the array after the third output signal group has been generated to cause the mechanism to scan said members; and stopping the scanning action of said mechanism when the latter is adjacent to said selected member, whereby the mechanism can become coupled to the selected member for retrieving the information therefrom.

15. A method as set forth in claim 14, wherein the step of generating a first signal group includes temporarily storing at least one input signal in a storage area having a number of signal outputs defining said first signal group.

16. A method as set forth in claim 14, wherein the step of storing the number includes counting to the number and sending a signal pulse to the corresponing signal-receiving location.

17. A method as set forth in claim 14, wherein said storing step includes counting to said number, advancing the signal-receiving location corresponding to said number from a starting position through a series of steps equal to said number, sending a signal pulse to the corresponding signal-receiving location after said number has been counted, and returning the pulsed location to its starting position.

18. A method as set forth in claim 14, wherein said mechanism moving step includes counting to the number represented by said second signal group and directing a deactuating signal pulse to said mechanism.

References Cited
UNITED STATES PATENTS

| | | | |
|---|---|---|---|
| 2,570,930 | 10/1951 | Filo et al. | 194—15 X |
| 2,621,241 | 12/1952 | Jensen | 340—162 |
| 2,624,795 | 1/1953 | Bodoh | 340—162 |
| 2,674,728 | 4/1954 | Potter | 340—162 X |
| 3,028,580 | 4/1962 | Durant | 194—15 X |
| 3,063,535 | 11/1962 | McVetty | 194—15 |

SAMUEL F. COLEMAN, Primary Examiner

U.S. Cl. X.R.

340—162